United States Patent
Perlmutter et al.

(10) Patent No.: US 11,032,628 B2
(45) Date of Patent: Jun. 8, 2021

(54) ELECTRONIC DEMODULATION OF OPTICALLY PHASE DEMODULATED SIGNALS

(71) Applicant: Lawrence Livermore National Security, LLC, Livermore, CA (US)

(72) Inventors: David Simon Perlmutter, Oakland, CA (US); Peter Thomas Setsuda DeVore, Livermore, CA (US); Apurva Shantharaj Gowda, Mountain View, CA (US); Jason Thomas Chou, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 10 days.

(21) Appl. No.: 16/869,320

(22) Filed: May 7, 2020

(65) Prior Publication Data

US 2021/0021914 A1    Jan. 21, 2021

Related U.S. Application Data

(60) Provisional application No. 62/876,242, filed on Jul. 19, 2019.

(51) Int. Cl.
*H04B 10/06* (2006.01)
*H04Q 11/00* (2006.01)
(Continued)

(52) U.S. Cl.
CPC ......... *H04Q 11/0005* (2013.01); *H04B 10/61* (2013.01); *H04J 14/02* (2013.01);
(Continued)

(58) Field of Classification Search
CPC ........ H04B 10/60; H04B 10/69; H04B 10/40; H04B 10/613; H04B 10/616;
(Continued)

(56) References Cited

U.S. PATENT DOCUMENTS 4,709,978 A    12/1987   Jackel
5,148,503 A     9/1992   Skeie
(Continued)

OTHER PUBLICATIONS

Abo, M., A., et al., "A 1.5-V, 10-bit, 14.3-MS/s CMOS Pipeline Analog-to-Digital Converter," IEEE Journal of Solid-State Circuits, vol. 34, No. 5, May 1999.
(Continued)

*Primary Examiner* — Hanh Phan
(74) *Attorney, Agent, or Firm* — Perkins Coie LLP

(57) ABSTRACT

Device, methods and systems for the electronic demodulation of optically phase demodulated signals are described. An example optical local oscillator generator configured to generate a radio frequency (RF) tone at a desired RF frequency includes a first input configured to receive a broadband optical pulse train, a second input coupled to a delay line interferometer to receive a first control voltage for controlling a delay value of the interferometer and to produce an output optical pulse train, a dispersive element, coupled to the delay line interferometer, to map the output optical pulse train to a time-domain modulated optical pulse train, an optical-to-electrical converter, coupled to the dispersive element, to convert the time-domain modulated optical pulse train to an analog electrical signal, and an RF filter, coupled to the optical-to-electrical converter, to filter the analog electrical signal to generate the RF tone at the desired RF frequency.

22 Claims, 9 Drawing Sheets

(51) Int. Cl.
  *H04J 14/02* (2006.01)
  *H04B 10/61* (2013.01)
  *G02F 1/21* (2006.01)

(52) U.S. Cl.
  CPC .......... *G02F 1/21* (2013.01); *G02F 2001/212* (2013.01); *H04Q 2011/0015* (2013.01); *H04Q 2011/0016* (2013.01); *H04Q 2011/0039* (2013.01); *H04Q 2011/0041* (2013.01)

(58) Field of Classification Search
  CPC ..................... H04B 10/697; H04B 10/548; H04B 10/5561; H04B 10/556; H04B 10/2575; H04B 10/25753; H04J 14/02
  USPC ....... 398/202, 204, 205, 206, 207, 208, 209, 398/212, 213, 214, 183, 188, 158, 159, 398/135, 136, 115, 116, 117
  See application file for complete search history.

(56) References Cited

U.S. PATENT DOCUMENTS

| | | | |
|---|---|---|---|
| 5,249,243 A | 9/1993 | Skeie | |
| 5,408,544 A | 4/1995 | Seino | |
| 6,671,298 B1 | 12/2003 | Delfyett et al. | |
| 6,724,783 B2 | 4/2004 | Jalali et al. | |
| 7,133,135 B2 | 11/2006 | Dorrer | |
| 7,259,901 B2 | 8/2007 | Parsons et al. | |
| 7,787,779 B2 | 8/2010 | Weiner et al. | |
| 7,868,799 B1 | 1/2011 | Price et al. | |
| 7,877,020 B1* | 1/2011 | Hayes ................... | H04B 10/50 398/198 |
| 7,940,380 B1 | 5/2011 | Benner | |
| 8,164,819 B2 | 4/2012 | Tu et al. | |
| 8,442,402 B1 | 5/2013 | Zanoni et al. | |
| 8,446,305 B1 | 5/2013 | Zanoni et al. | |
| 8,456,336 B1 | 6/2013 | Zanoni et al. | |
| 8,478,132 B1 | 7/2013 | Jepsen et al. | |
| 8,548,331 B1 | 10/2013 | Zanoni et al. | |
| 8,779,955 B1 | 7/2014 | Zanoni et al. | |
| 8,934,058 B2 | 1/2015 | Chou et al. | |
| 8,965,211 B1 | 2/2015 | Zanoni et al. | |
| 9,118,423 B1 | 8/2015 | Zanoni et al. | |
| 9,197,471 B1 | 11/2015 | Zanoni et al. | |
| 9,356,704 B1 | 5/2016 | Zanoni et al. | |
| 9,843,398 B1 | 12/2017 | Zanoni et al. | |
| 9,857,660 B1 | 1/2018 | Devore et al. | |
| 9,888,303 B1 | 2/2018 | Jepsen et al. | |
| 10,063,320 B2 | 8/2018 | Clark et al. | |
| 10,069,619 B1 | 9/2018 | Zanoni et al. | |
| 10,075,154 B1 | 9/2018 | Hsieh | |
| 2012/0148264 A1* | 6/2012 | Liu ........................ | H04B 10/61 398/202 |
| 2012/0212360 A1 | 8/2012 | Kanter et al. | |
| 2013/0062508 A1 | 3/2013 | Kanter et al. | |
| 2013/0209089 A1* | 8/2013 | Harley ............... | H04B 10/5561 398/25 |

OTHER PUBLICATIONS

Bao, X., et al., "Recent Progress in Distributed Fiber Optic Sensors," Sensors 2012, 12, 8601-8639.
Batagelj, B., et al., "Key Properties and Design Issues for an Opto-Electronic Oscillator," ICTON 2015.
Burns, K., W., et al., "Second Harmonic Generation in Field Poled, Quasi-Phase-Matched, Bulk LiNbO3," IEEE Photonics Technology Letters, vol. 6. No. 2, Feb. 1994.
Chen, Y., K., et al., "Integrated Photonic Digital-to-Analog Converter for Arbitrary Waveform Generation," Bell Laboratories, Alcatel-Lucent, 600 Mountain Avenue, New Jersey, U.S.A., 2019.
Davari, B., et al., "CMOS Scaling for High Performance and Low Power—The Next Ten Years," Proceedings of the IEEE, vol. 83, No. 4, Apr. 1995.
De La Rosa, E., et al., "All-fiber absolute temperature sensor using an unbalanced high-birefringence Sagnac loop," Optics Letters, vol. 22, No. 7, Apr. 1, 1997.
Devore, S., T., P., et al., "Enhancing electrooptic modulators using modulation instability," Phys. Status Solidi RRL 7, No. 8 (2013).
Devore, S., T., P., et al., "Light-weight flexible magnetic shields for large-aperture photomultiplier tubes," Nuclear Instruments and Methods in Physics Research A 737(2014) 222-228.
Devore, S., T., P., et al., "Near-field and complex-field time-stretch transform," Proc. of SPIE vol. 9141, 2014.
Devore, S., T., P., et al., "Rogue events and noise shaping in nonlinear silicon photonics," Journal of Optics 15, 2013.
Devore, S., T., P., et al., "Stimulated supercontinuum generation extends broadening limits in silicon," Appl. Phys. Lett. 100, 101111 (2012).
Devore, S., T., P., et al., Coherent Time-Stretch Transform for Near-Field Spectroscopy, IEEE Photonics Journal, vol. 6, No. 2, Apr. 2014.
Dumin, J., D., et al., "Oxide Wearout, Breakdown, and Reliability," International Journal of High Speed Electronics and Systems, vol. 11, No. 3 (2001) 617-718.
Eickhoff, W., "Temperature sensing by mode-mode interference in birefringent optical fibers," Optics Letters, vol. 6, No. 4, Apr. 1981.
Eliyahu, D., et al., "Tunable, Ultra-Low Phase Noise YIG Based Opto-Electronic Oscillator," IEEE MTT-S Digest, 2003.
Fard, M., A., et al., "Impact of Optical Nonlinearity on Performance of Photonic Time-Stretch Analog-to-Digital Converter," Journal of Lightwave Technology, vol. 29, No. 13, Jul. 1, 2011.
Fortier, M., T., "Generation of ultrastable microwaves via optical frequency division," Nature Photonics, vol. 5, Jul. 2011.
Fortier, M., T., et al., "Optically referenced broadband electronic synthesizer with 15 digits of resolution," Laser Photonics Rev. 10, No. 5, 780-790 (2016).
Gee, M., C., et al., "Spurious-Free Dynamic Range of a High-Resolution Photonic Time-Stretch Analog-To-Digital Converter System," Microwave and Optical Technology Letters, vol. 54, No. 11, Nov. 2012.
Gee, M., C., et al., Spurious-Free Dynamic Range of a High-Speed Photonic Time-Stretch A/D-Converter System, Advanced Photonics Congress © 2012.
Gregers-Hansen, V., et al., "A Stacked A-to-D Converter for Increased Radar Signal Processor Dynamic Range," Radar Division, Naval Research Laboratory Washington, DC 20375, 2019.
Ikeda, K., et al., "Optical quantizing and coding for ultrafast A/D conversion using nonlinear fiber-optic switches based on Sagnac interferometer," May 30, 2005, vol. 13, No. 11, Optics Express 4297.
Jiang, Y., et al., "Analog optical computing primitives in silicon photonics," Optics Letters, vol. 41, No. 6, Mar. 2016.
Jung, K., et al., "All-fibre photonic signal generator for attosecond timing and ultralow-noise microwave," Scientific Reports, 5:16250, DOI: 10.1038/srep16250, 2015.
Juodawlkis, W., P., et al., "Optically Sampled Analog-to-Digital Converters," IEEE Transactions on Microwave Theory and Techniques, vol. 49, No. 10, Oct. 2001.
Kim., H., et al., "Sub-20-Attosecond Timing Jitter Mode-Locked Fiber Lasers," IEEE Journal of Selected Topics in Quantum Electronics, vol. 20, No. 5, Sep./Oct. 2014.
Kitayama, K, et al., "Ultrafast All-Optical Analog-to-Digital Conversion using Fiber Nonlinearity," ECOC 2009, Sep. 20-24, 2009, Vienna, Austria.
Liao, J., et al., "Novel Photonic Radio-frequency Arbitrary Waveform Generation based on Photonic Digital-to-Analog Conversion with Pulse Carving," Department of Electronic Engineering, Tsinghua University, Beijing, I 00084, China, 2019.
Linde, D., et al., "Characterization of the Noise in Continuously Operating Mode-Locked Lasers," Appl. Phys. B 39, 201-217 (1986).
Luennemann, M., et al., "Electrooptic properties of lithium niobate crystals for extremely high external electric fields," Appl. Phys. B 76, 403-406 (2003).
Miyoshi, Y., et al., "Multiperiod PM-NOLM With Dynamic Counter-Propagating Effects Compensation for 5-Bit All-Optical Analog-to-

(56) References Cited

OTHER PUBLICATIONS

Digital Conversion and Its Performance Evaluations," Journal of Lightwave Technology, vol. 28, No. 4, Feb. 15, 2010.

Miyoshi, Y., et al., "Performance Evaluation of Resolution-Enhanced ADC Using Optical Multiperiod Transfer Functions of NOLMs," IEEE Journal of Selected Topics in Quantum Electronics, vol. 18, No. 2, Mar./Apr. 2012.

Moazzami, R., et al., "Projecting Gate Oxide Reliability and Optimizing Reliability Screens," IEEE Transactions on Electron Devices. vol. 37. No. 7. Jul. 1990.

Reilly, R., D., et al., "Undersampling a photonic analog-to-digital converter containing an optical hybrid combiner," Optics Communications 288 (2013) 31-37.

Robinson, R., "Polarization modulation and splicing techniques for stressed birefringent fiber," Rochester Institute of Technology RIT Scholar Works, Thesis/Dissertation Collections, Jan. 1995.

Rodwell, W., J., M., et al., "Subpicosecond Laser Timing Stabilization," IEEE Journal of Quantum Electronics, vol. 25, No. 4. Apr. 1989.

Sherman, A., et al., "Optical under-sampling by using a broadband optical comb with a high average power," Optical Society of America, Jun. 2014, vol. 22.

Wei, J., et al., "All-fiber-photonics-based ultralow-noise agile frequency synthesizer for X-band radars," vol. 6, No. 1 / Jan. 2018 / Photonics Research.

Xiao, J., et al., "High-Frequency Photonic Vector Signal Generation Employing a Single Phase Modulator," IEEE Photonics Journal, vol. 7, No. 2, Apr. 2015.

Xie, X., et al., "Photonic microwave signals with zeptosecond-level absolute timing noise," Nature Photonics, vol. 11, Jan. 2017.

Yao, S., X., et al., "Converting light into spectrally pure microwave oscillation," Optics Letters, vol. 21, No. 7, Apr. 1996.

Yao, S., X., et al., "Optoelectronic Oscillator for Photonic Systems," IEEE Journal of Quantum Electronics, vol. 32, No. 7, Jul. 1996.

Zhou, D., et al., "Single-shotBOTDA based on an optical chirp chain probe wave for distributed ultrafast measurement," Light: Science & Applications (2018) 7:32, Official journal of the CIOMP 2047-7538.

Zou, W., et al., "One-laser-based generation/detection of Brillouin dynamic grating and its application to distributed discrimination of strain and temperature," Optics Express 2363, vol. 19, No. 3, Jan. 2011.

\* cited by examiner

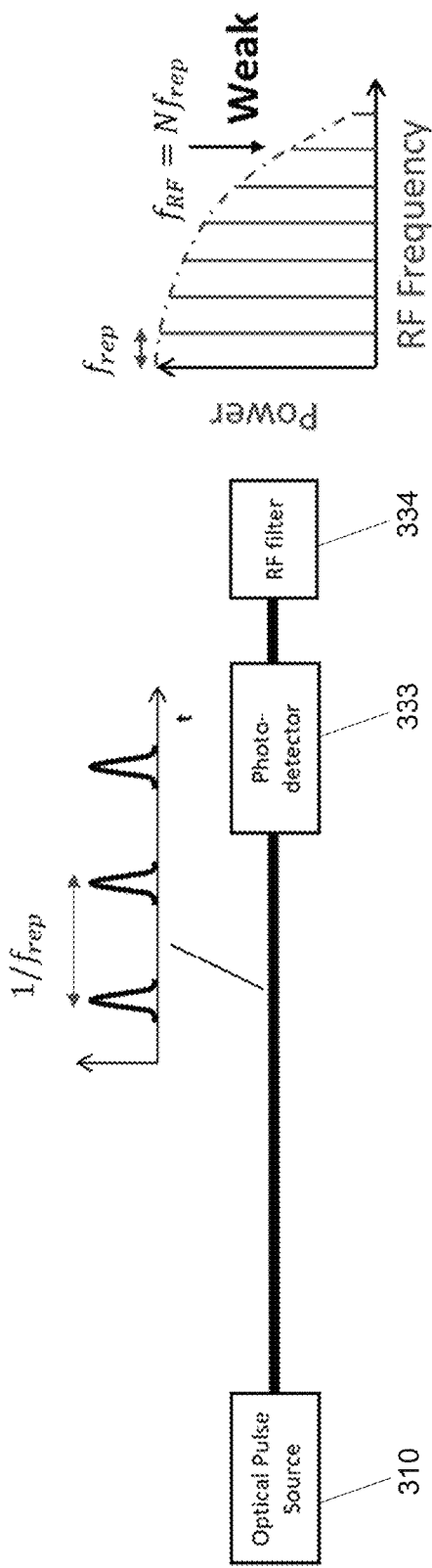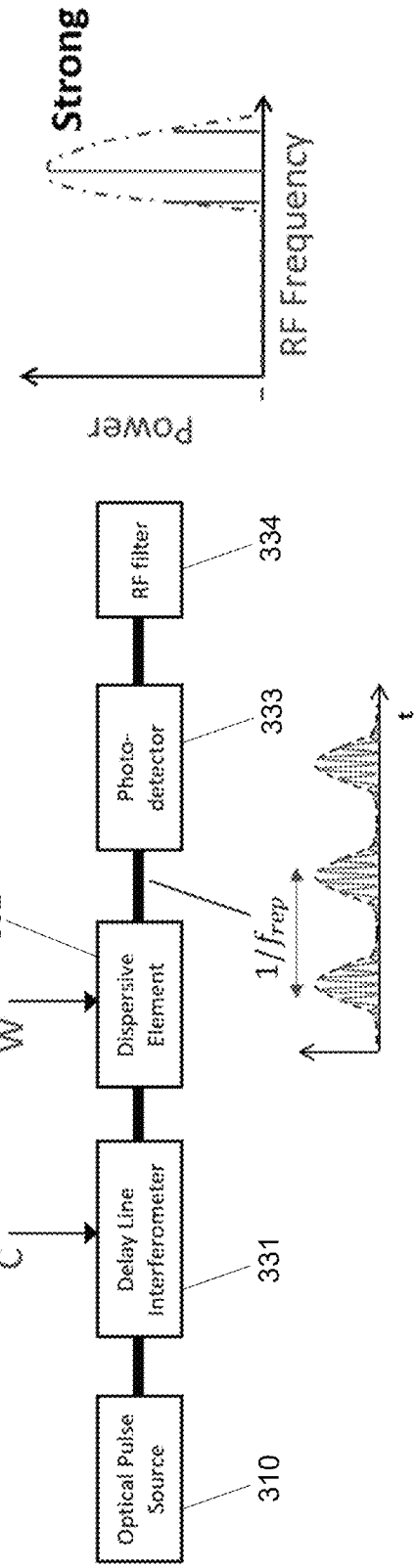
FIG. 3A
FIG. 3B

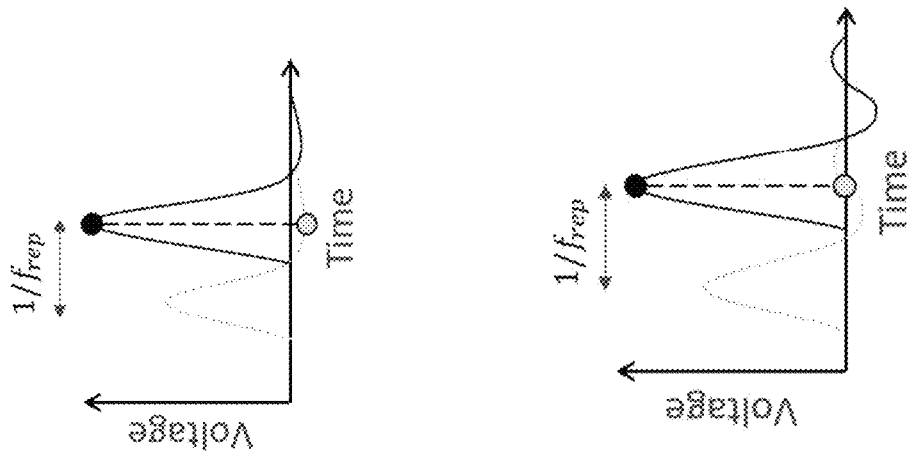
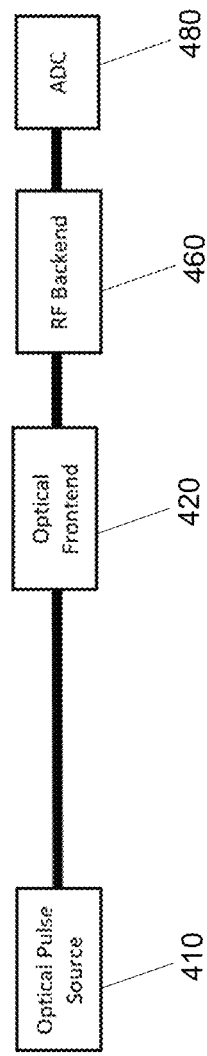
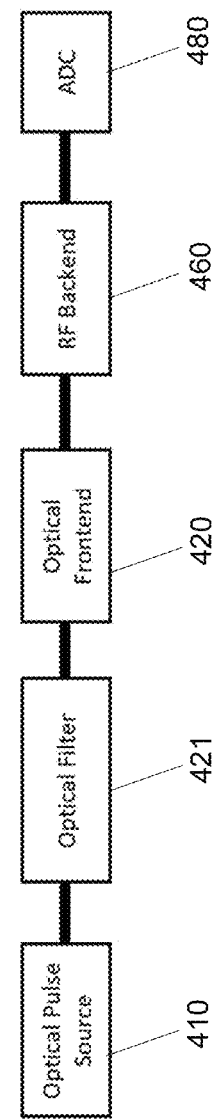
FIG. 4A
FIG. 4B

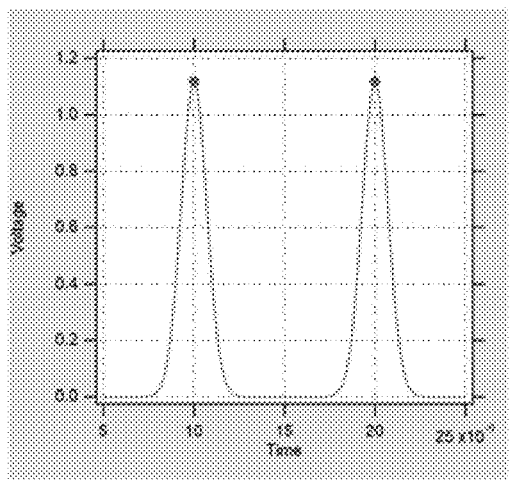
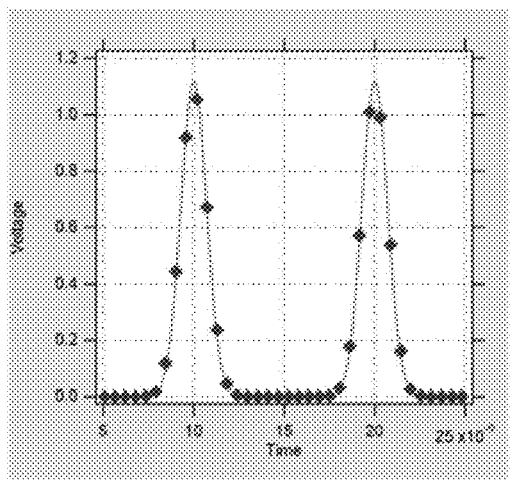
FIG. 5A  FIG. 5B
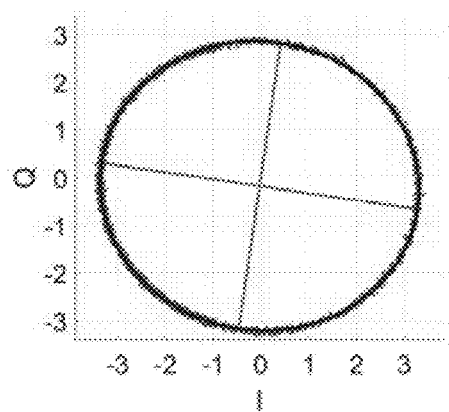
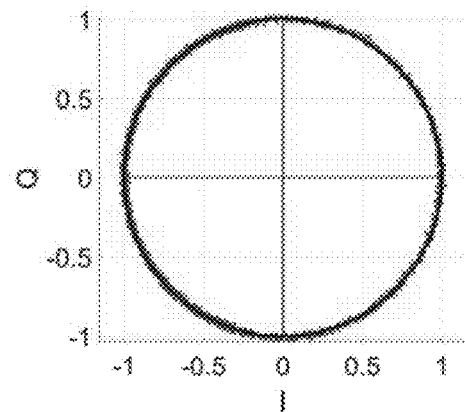
FIG. 6

ELECTRONIC DEMODULATION OF OPTICALLY PHASE DEMODULATED SIGNALS

CROSS-REFERENCE TO RELATED APPLICATION

This patent document claims priority to and benefit of U.S. Provisional Patent Application No. 62/876,242 entitled "ELECTRONIC DEMODULATION OF OPTICALLY PHASE DEMODULATED SIGNALS" and filed on Jul. 19, 2019. The entire content of the before-mentioned patent application is incorporated by reference as part of the disclosure of this patent document.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This patent document is directed generally to optical communication, and more particularly, electronic demodulation of optically phase demodulated signals.

BACKGROUND

Electronics-based analog-to-digital converters suffer from multiple noise sources that limit their performance, namely thermal noise, sampling aperture jitter, and comparator ambiguity. Temporal optical modulation creates optical pulses with interference fringes that move in time according to an input analog voltage. While these waveforms can be measured directly with a high sampling rate electronic digitizer, it may be difficult in some applications to find a suitable digitizer, especially if the application requires very high repetition rate laser pulses.

SUMMARY

Embodiments of the disclosed technology relate to methods, devices and systems for the electronic demodulation of optically phase demodulated signals. The disclosed embodiments can, for example, be used in many fields such as scientific diagnostics, radar, remote sensing, and communications.

In an example, the described embodiments can be used to improve diagnostic sensitivity at high bandwidth, reduce errors and prevent optics and photonics damage in single-shot radio frequency (RF) measurements requiring both high sensitivity and bandwidth (e.g., the Channel Amplitude Modulation Temporal (AMT) diagnostic that screens National Ignition Facility (NIF) pulse shapes before they are amplified to prevent damage to expensive optics).

In another example, the described embodiments can be used as a stand-alone recording instrument or a frontend to an existing oscilloscope product since they can achieve high dynamic range, wideband, continuous time digitization beyond the performance conventional oscilloscopes.

The disclosed embodiments include an apparatus and a method for extracting optically phase modulated signals in the electronic domain. In some embodiments, an input voltage signal is used to shift the ripple of an optical pulse using an interferometric technique. The optical pulses are then converted to electronic phase-shift keying (PSK) pulses, with a photodetector and an RF filter. Finally, the PSK pulses are demodulated in an RF mixer, using a local oscillator (LO) derived from the original, unmodulated laser pulses. This advantageously allows a single channel, phase-modulated optical signal to be demodulated using standard, off-the-shelf RF components.

BRIEF DESCRIPTION OF THE DRAWINGS

FIG. 3A is a block diagram representation of an example spectral redirection subsystem, in accordance with some embodiments of the presently disclosed technology.

FIG. 3B is a block diagram representation of another example spectral redirection subsystem, in accordance with some embodiments of the presently disclosed technology.

FIG. 4A is a block diagram representation of an example spectral pulse shaping subsystem, in accordance with some embodiments of the presently disclosed technology.

FIG. 4B is a block diagram representation of another example spectral pulse shaping subsystem, in accordance with some embodiments of the presently disclosed technology.

FIG. 5A illustrates an example of pulse synchronization.

FIG. 5B illustrates another example of pulse synchronization.

FIG. 6 illustrates an example of pulse distortion.

DETAILED DESCRIPTION

Figure 1:
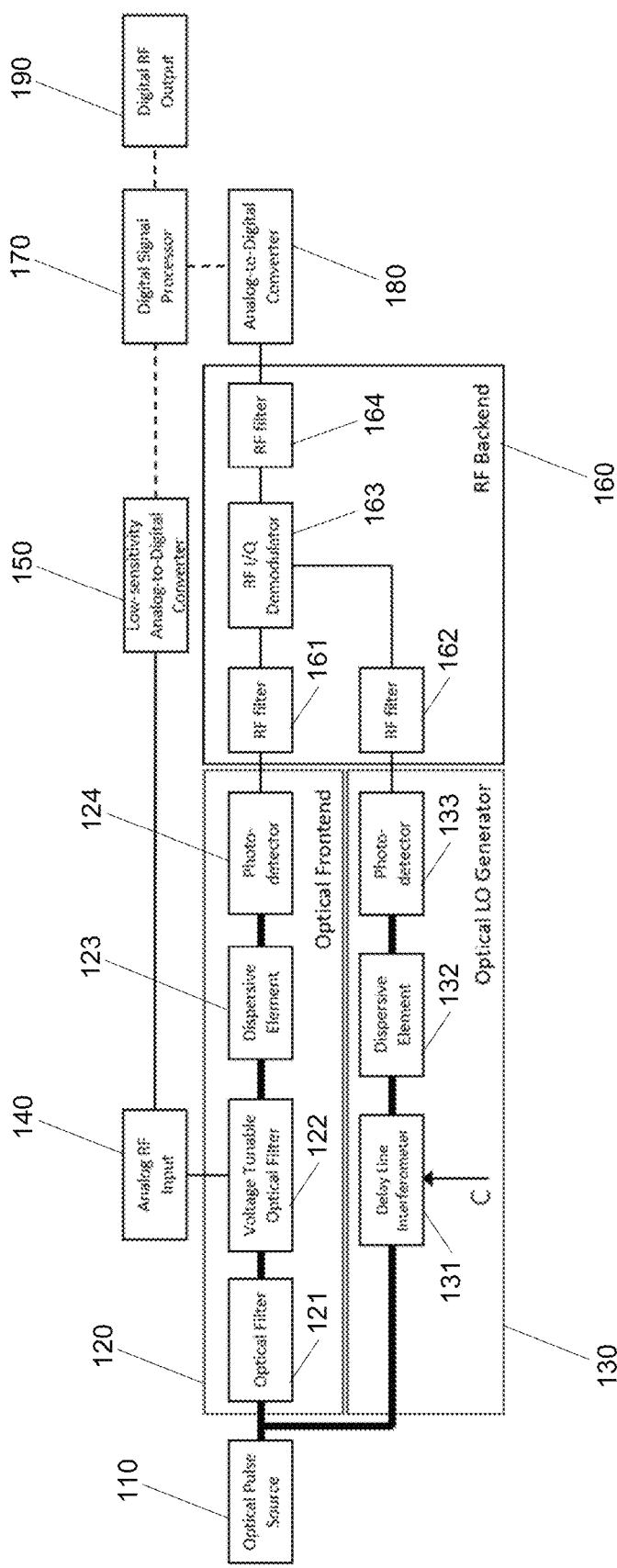
FIG. 1 is a block diagram representation of an example receiver configured to extract optically phase modulated signals in the electronic domain.

The present document uses section headings and sub-headings for facilitating easy understanding and not for limiting the scope of the disclosed techniques and embodiments to certain sections. Accordingly, embodiments disclosed in different sections can be used with each other.

Drawbacks of Existing Systems and Implementations

The performance of existing systems that implement electronics-based ADCs suffer from multiple noise sources, such as thermal noise, sampling aperture jitter, and comparator ambiguity. Sampling jitter is particularly important for applications with high signal bandwidth since its effective noise scales linearly with signal. For this reason, ADC performance typically drops (and cost goes up) drastically with high bandwidth. For example, a typical mid-tier ADC chip can measure 2 GHz electronic signals with 1450 levels of resolutions and costs $150, while a 20 GHz commercial oscilloscope provides only ~81 resolvable levels for approximately $220K.

One technique to improve the accuracy of high-speed ADCs is optical sampling. An example optical sampling method uses ultrashort optical pulses from a mode-locked laser (MLL) to encode electronic information, after which the optical pulses are quantized with an electronic ADC. An advantage of this technique is that MLL pulses have extremely low jitter. However, a disadvantage of this technique is that it achieves amplitude modulation with a Mach-Zehnder modulator (MZM), which has a non-linear response at strong voltage. This limits the acceptable input voltage range of the device.

Another technique that avoids the MZM non-linearity uses phase instead of amplitude modulation on the optical pulse. Since electro-optic phase modulation is highly linear, this allows a much larger range on input signals. However, since optical phase cannot be measured directly, this technique requires mixing with a coherent reference to extract the phase information. This is typically done with an optical hybrid device, which mixes the input pulse stream with a local oscillator having both 0- and 90-degree phase shifts, producing an in-phase (I) and quadrature (Q) optical output pulse. These two pulses can be used to extract the original phase modulation. However, a disadvantage of this technique is that optical hybrids are known to have phase biases, poor extinction ratios, and are relatively expensive. Also, this technique doubles the number of optical channels.

In contrast to existing techniques, embodiments of the disclosed technology, among other features and benefits, can demodulate an optically phase-encoded pulse in the electronic domain without using an optical hybrid.

Example Embodiments of the Disclosed Technology

The embodiments described in the present document convert temporal modulation on optical pulses into the analog RF domain. Temporal optical modulation (as described, for example, in U.S. Pat. No. 8,934,058, which is incorporated by reference in its entirety for all purposes in this document) creates optical pulses with interference fringes that move in time according to an input analog voltage. While these waveforms can be measured directly with a high sampling rate electronic digitizer, it may be difficult in some applications to find a suitable digitizer, especially if the application requires very high repetition rate laser pulses. In some embodiments of the disclosed technology, the phase of the temporally modulated fringes is encoded onto the relative amplitude of two electronic pulses, so that it can be measured with just two digital samples.

Some of the operations that can be carried out of embodiments of the disclosed technology can be summarized as follows:

(1) A portion of the unmodulated laser pulses are converted into a RF local oscillator (LO), frequency matched to the optical pulse fringes, through a process called "spectral redirection";

(2) The temporally modulated pulses are mixed with this RF LO to produce corresponding in-phase (I) and quadrature (Q) pulses; and (3) The I and Q RF pulses are measured by independent electronic samplers, and used to digitally reconstruct the optical fringe phase shift and, therefore, the input voltage.

FIG. 1 is a block diagram representation of a receiver configured to extract optically phase modulated signals in the electronic domain. As illustrated therein, the receiver includes (a) an optical pulse source 110, (b) a voltage tunable optical filter (VTOF) 122 to create spectral changes in optical pulses (which is part of the Optical Frontend 120 illustrated in FIG. 1), (c) a time delay interferometer 131 which creates optical pulses with a fixed spectral ripple, matched to the ripple frequency of the VTOF, (d) a dispersive element 132 to map spectral profiles into time domain waveforms, (e) a photodetector 133 to convert from optical to electrical waveforms (with elements (c)-(e) being part of the Optical LO Generator 130), (f) an RF mixer (or RF Backend) 160 to convert the time modulated information into amplitude (I and Q), and (g) digital signal processing 170 to reconstruct a high-resolution estimate of the original input voltage.

As illustrated in FIG. 1, the optical pulse source 110 generates a periodic train of broadband optical pulses that is split into two paths. The first path is optionally filtered by an optical filter 121 to create a desired spectral profile. It then passes through the voltage tunable optical filter (VTOF) 122 to imprint a sinusoidally varying spectral pattern proportional to the input signal voltage. The second pulse train goes through a similar, but fixed, filter. Both pulses are then dispersed to map their spectral ripple into their temporal shape, then photodetected by photodetectors 124, 133, creating RF pulses. The first pulse train carries the input signal information modulated onto the temporal phase of the pulse ripple, similar to a phase-shift keying (PSK) RF modulation scheme. The second train may be interpreted as an unmodulated reference, or a local oscillator (LO). The modulated arm is high-pass filtered to remove DC content, and the LO arm passes through a linewidth bandpass filter to produce a single RF tone, which simplifies timing with the signal arm. Then, both filtered arms are fed into an I/Q demodulator, where the LO downshifts the signal pulses to baseband both in-phase (I) and in quadrature (Q). After low pass RF filtering to reject undesirable second harmonic content, the I and Q pulses are sampled by two synchronized analog-to-digital converters. This information, plus an independent, direct, low-resolution measurement of the input, is processed digitally to reconstruct a high-resolution estimate of the original input voltage.

As illustrated in FIG. 1, an apparatus for extracting optically phase modulated signals in the electronic domain includes the following components:

(1) An optical frontend 120 configured to impart the analog RF input onto an optical pulse train generated by the optical pulse source. In some embodiments, the optical frontend may optionally include an optical filter 121 (shown between the optical pulse source and the VTOF in FIG. 1, and further discussed in the context of FIG. 4B). In some embodiments (see, for example FIG. 4B), the optical filter 121 is implemented outside of, and prior to, the optical frontend 120.

(2) An optical LO generator 130 that is configured to convert an optical pulse train into a very high-power very low phase noise RF tone, which is needed to the subsequent mixing operation in an RF backend 160. In some embodiments, optical LO generator includes a delay line interferometer that can be controlled using an input voltage (denoted "C" in FIG. 1, and further discussed in the context of FIG. 3B).

(3) The RF backend 160 that performs filtering, mixing and downconversion operations, and specifically, using the output from the optical LO generator 130 to mix and downconvert the output from the optical frontend 120.

(4) A high-sensitivity analog-to-digital converter (ADC) 180 to convert the output of the RF backend 160 from an RF analog signal to a digital signal.

In some embodiments, the use of the RF backend advantageously enables the high-sensitivity ADC to be a narrowband device instead of a wideband device. Since the RF backend mixes and downconverts the output of the optical frontend using the output of the optical LO generator, the digitization of the downconverted signal does not require a wideband ADC, as would be the case if the output of the optical frontend were directly digitized.

(5) A digital signal processor (DSP) 170 that combines signals from a low-sensitivity ADC (shown as the upper branch in FIG. 1) and the high-sensitivity ADC 180 to generate the desired digital RF output, which exhibits low noise and distortions compared to existing systems.

In some embodiments, the photodetector 124 that receives the optical signals of the frontend 120 is a balanced photodetector that receives two complementary optical signals (having a phase shift of 180 degrees) to produce a single RF modulated output that is provided to the RF backend 160. In these embodiments, the dispersive element 124 is configured to have two inputs and two outputs. Example implementations of a 2-input-2-output dispersive element include two separate elements (such as two separate optical fibers) or a single element with two channels (such as two different polarization modes).

In some embodiments, the output of the low-sensitivity ADC 150 provides a coarse, albeit unambiguous, value of the phase in the analog RF input, whereas the high-sensitivity ADC 180 provides a fine phase measurement but with phase ambiguity. The DSP may be configured to perform at least a phase unwrapping operation that combines the signals from the high- and low-sensitivity ADCs to generate an RF signal with accurate and unambiguous phase information.

Figure 2A:
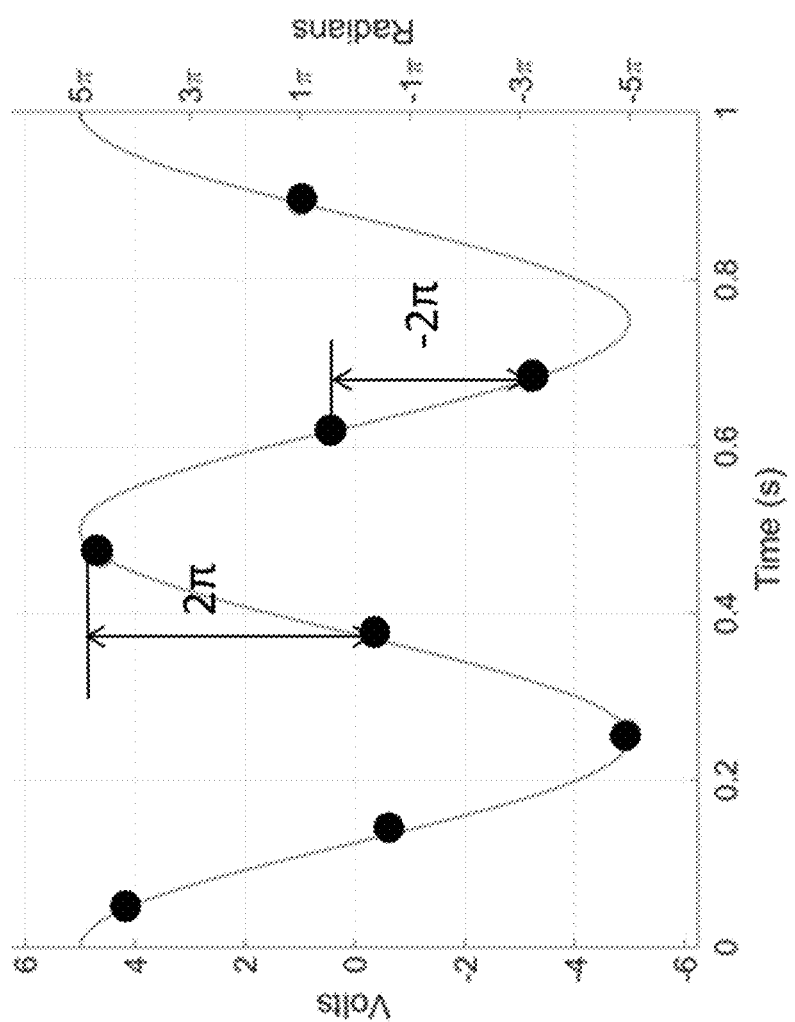
FIG. 2A illustrates an example technique for phase unwrapping.

FIG. 2A illustrates an example method of unwrapping the phase information in accordance with the present technology. This method assumes that the RF signal is a slow varying electrical signal that does not vary more than $V_\pi$ volts per sample. As shown in FIG. 2A, any discrete, sample-to-sample jumps of greater than $\pi$ in the ambiguous signal are assumed to be off by exactly $2\pi$ if the jump is positive, or $-2\pi$ if the jump is negative. Thus, the entire signal can be unwrapped point-by-point sequentially.

Figure 2B:
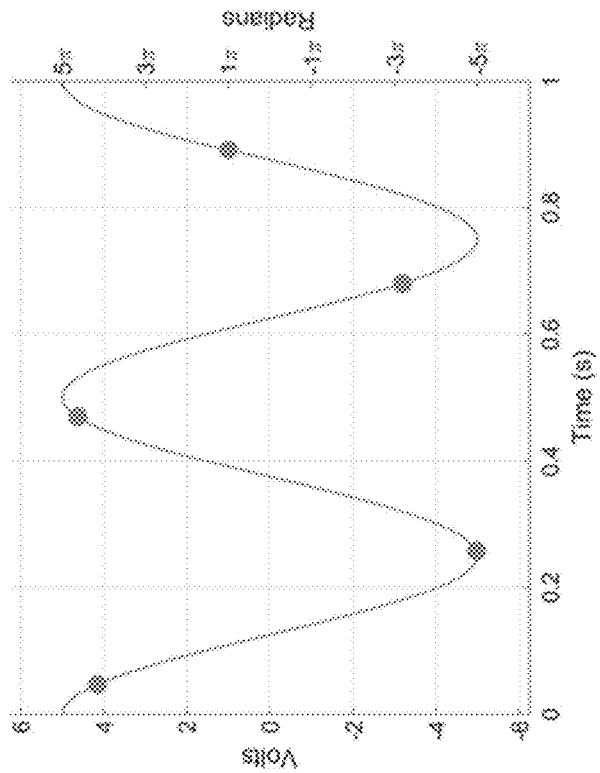
FIG. 2B illustrates another example technique for phase unwrapping.
Figure 2B:
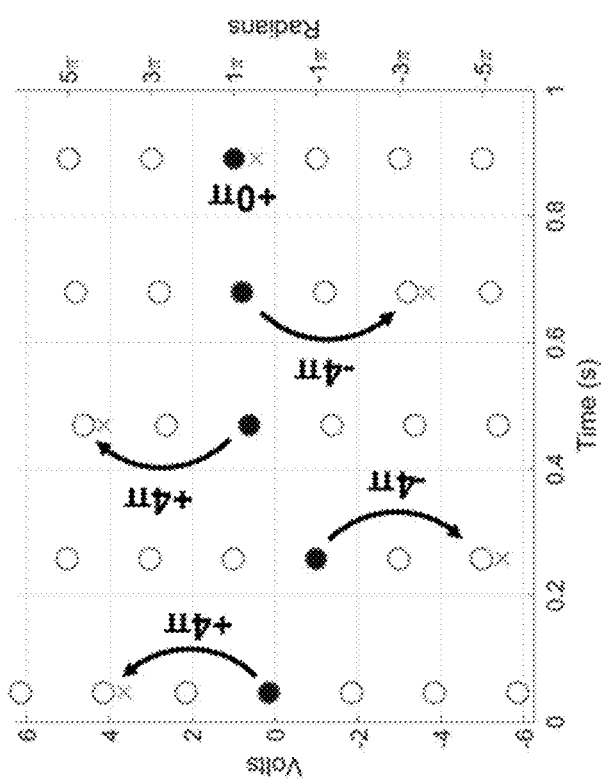

FIG. 2B illustrates another example method of unwrapping the phase information in accordance with the present technology. This method does not make any assumption about the RF signal and requires a coarse signal to determine the exact phase value. First, the unwrapping channel is converted from units of volts (left vertical axis) to radians (right vertical axis). The wrapped channels can be corrected to match the mean of the unwrapping channel. The difference between the two measurements is rounded to the nearest a and added onto the wrapped channel to produce the unwrapped estimate. To ensure no errors occur in the unwrapping, the unwrapping channel cannot have a sampling error greater than $\pi$ radians, or $V_\pi$ volts. Since electro-optical modulator $V_\pi$ values are generally around 1 to 4 V, this is achievable.

FIGS. 3A and 3B are block diagram representations of example spectral redirection subsystems, which are configured to generate the RF local oscillator (LO). In particular, a goal of the spectral redirection subsystem is to efficiently produce an RF tone at the optical ripple frequency of the VTOF, which is chosen to be a multiple of the laser repetition rate for optimal efficiency. FIG. 3A illustrates a configuration in which the optical pulse train is directly detected, and the desired comb line is filtered out from the comb. However, this produces a very weak, and thus noisy, LO.

FIG. 3B illustrates an embodiment in which a delay line interferometer plus dispersion alters the spectrum of the optical power to be highly concentrated about the desired RF line, which leads to a stronger RF LO. In contrast to the configuration illustrated in FIG. 3A wherein a pulse train from the optical pulse source 310 enters the photodetector 333, the output of the dispersive element 332 in FIG. 3B is a train of modulated pulses which enters the photodetector 333, resulting in an increased strength in the desired frequency.

In some embodiments, as illustrated in FIG. 3B, the optical LO generator includes a delay line interferometer 331 (which may be controlled by a first input voltage denoted "C"), a dispersive element (which may be controlled by a second input voltage denoted "W") and a photodetector. In an example, the delay line interferometer may be a Mach-Zehnder modulator (MZM), whose delay is controlled by a first input voltage ("C"), which is used to align the gain peak with the frequency of interest. For example, the delay line interferometer may include an electrooptic modulator coupled to a first input to receive the broadband optical pulse train and to produce two complementary optical outputs that form two arms of an interferometer. An optical delay component coupled to the electrooptic modulator and to a second input that receives a control voltage to impart an optical path difference, based on the control voltage, C, into one of the two complementary optical outputs of the electrooptic modulator. The interferometer can further include a combiner/splitter to receive the two complementary optical outputs of the electrooptic modulator after impartation of the optical path difference and to produce an output optical pulse train. The dispersive element in FIG. 3B may be controlled by a second input voltage ("W"). As illustrated in the bottom right plot in FIG. 3B, the modulated pulse output of the dispersive element can be isolated to provide the desired high-power very low phase noise RF tone. In an example, the "C" and "W" input voltages control the location and width of the parabola in the bottom right plot. The embodiment illustrated in FIG. 3B is termed as "spectral redirection" since the power in the optical pulse train is re-directed into the frequencies (or bands) of interest.

FIGS. 4A and 4B are block diagram representations of example spectral pulse shaping subsystems, which are configured to perform optimal pulse sampling. While it is desirable to have high repetition rate optical pulses for larger Nyquist bandwidths, the finite bandwidth of the RF backend can potentially cause closely spaced pulses to spread into each other, causing inaccurate sampling (as illustrated in FIG. 4A). It is well known that this problem, known as inter-symbol-interference (ISI), can be alleviated if, at the precise sampling instant of a pulse, neighboring pulses are shaped to have nearly zero energy.

One embodiment of such a pulse shaping system is to shape the spectrum of the optical pulse train before passing through the VTOF (as illustrated in FIG. 4B). After dispersion, the spectral shape of the filter will be converted into the time domain envelope of the pulse, which will eventually be converted to an RF pulse through the photodetector. In this way, the optical filter can be used to fine tune the RF pulse shape in such a way that, after passing through the RF backend, the pulse will have negligible energy at the next sample (e.g., its energy will vanish T seconds after its peak, where T is pulse period).

In some embodiments, the spectral pulse shaping subsystem could use a standard photodetector. In other embodiments, a balanced photodetector is used if both complimentary outputs of the VTOF are available. A balanced photodetector has the benefit of providing more control over the RF pulse shape, at the cost of greater timing sensitivity.

In some embodiments, the optical filter 421 (also referred to as a wave shaper) illustrated in FIG. 4B may include an optical modulator (for wavelength-time mapping) and a static optical spectral shaping filter to advantageously compensate for the ISI effects due to the ADC. In an example, wavelength-time mapping (WTM) converts the spectral components of an ultrafast optical signal into a temporal sequence via linear dispersion. For example, a fast photodetector is used to probe the dispersively stretched pulse and convert it into a sequence of power readings that represent the spectral profile of the original pulse.

In the example illustrated in FIG. 4B, the optical filter 421 is located before the optical frontend 420. In other examples, the optical filter may be located before or after the VTOF, or before or after the dispersive element. In effect, the optical filter must be placed prior to the photodetector to ensure that the pulse shaping due to the optical filter can compensate for the ISI.

In an example, the optical filter may be configured to match the transfer functions of the RF backend and/or ADC. For instance, the transfer functions of the RF backend 460 and ADC 480 may be first computed and combined. Then, a pre-compensation transfer function of the combined RF transfer function is computed and used to configure the optical filter. Applying the pre-compensation transfer function in the optical filter to the input signal pre-compensates for the effects of the RF backend and ADC (and more generally, the electronic components), thereby reducing or eliminating ISI.

Ideally, the pre-compensation transfer function would be simply be the inverse of the RF transfer function. However, since the optical pulse energy must always be non-negative, arbitrary transfer functions are not possible. In an example, a method to calculate the optical pre-compensation transfer function includes reducing the repetition rate of the laser by a factor greater than 2, then manually tuning the optical filter shape and examining the first zero crossing point of the RF pulse. The filter can then be set to the point at which the first zero crossing occurs T seconds after its peak aligns. For simplicity, the optical filter shape can be set to produce a parameterized shape (e.g., a Tukey window).

Embodiments of the disclosed technology further include the quantization of electronic pulses exiting the RF backend. This step measures the energy in each pulse, from which the input voltage at the sampling instant is determined through digital signal processing. An example method for pulse quantization involves sampling each pulse once, at its peak (as illustrated in FIG. 5A). The benefit of this method is that it uses only one digital sample per pulse but requires synchronizing the ADC and the pulse stream with an external clock, derived from the laser. Another example method involves sampling each pulse multiple times with a free running ADC (as illustrated in FIG. 5B). The pulse energy can then be integrated digitally. This has the benefit of requiring no synchronization and providing potentially higher accuracy because the ADC noise can be averaged by multiple samples. However, it requires a faster ADC and more digital processing.

Embodiments of the disclosed technology further include digital correction of the sampled energies. Ideally, the I and Q pulses should be proportional to the sine and cosine of the modulated phase in the VTOF at the time of sampling. Thus, when plotted on the axes of a graph, the I and Q pulses from all possible modulated phases should form a circle (as illustrated in the right hand plot in FIG. 5). Any deviation from a true circle in this I/Q plot is a result of distortion in the system (as illustrated in the left hand plot in FIG. 6).

In some embodiments, the removal of such distortions is achieved by fitting an ellipse to a collection of data that samples all possible modulated phases. The ellipse fit estimates 5 parameters: x-y center location, x-y axis length, and tilt. Once fit, the corrections are applied to dewarp the data back onto a circle. This procedure removes potentially biases and/or offsets in hardware components such as the optical modulator, RF mixer, digitizers, etc.

Embodiments of the disclosed technology further include (or support) multiple channels to enable higher sample rates, which may be needed for high bandwidth and/or streaming applications. In some embodiments, this is implemented via "channelization" which increases the overall sample rate of the system while limiting the sampling requirements of any one electronic ADC. Channelization can be performed both in the RF and optical domain and can utilize both time and frequency multiplexing, as illustrated in the block diagram representations in FIGS. 7A-7D.

Figure 7A:
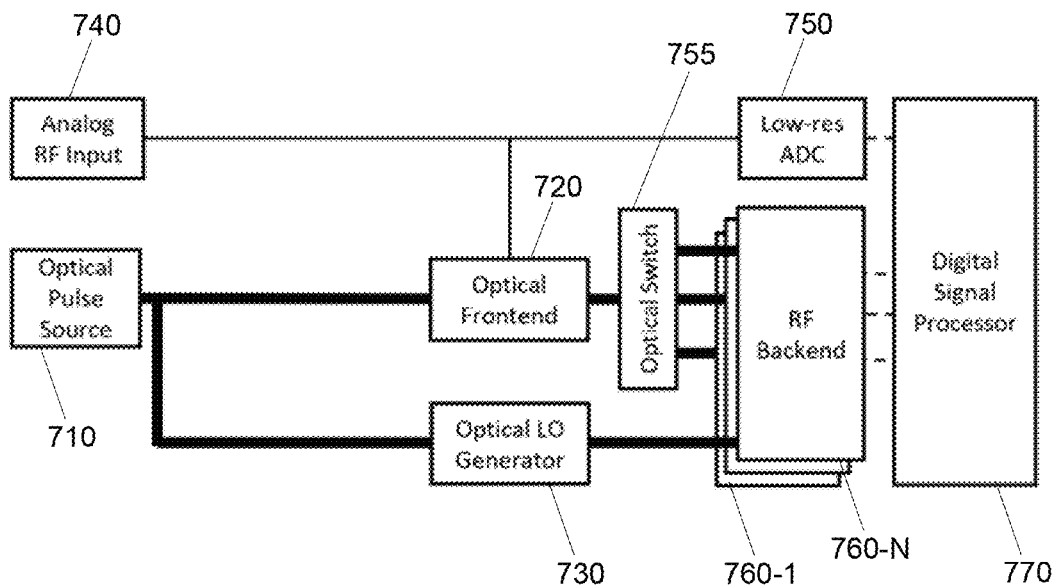
FIG. 7A is a block diagram representation of an optically channelized and time multiplexed receiver for extracting optically phase modulated signals in the electronic domain.
Figure 7B:
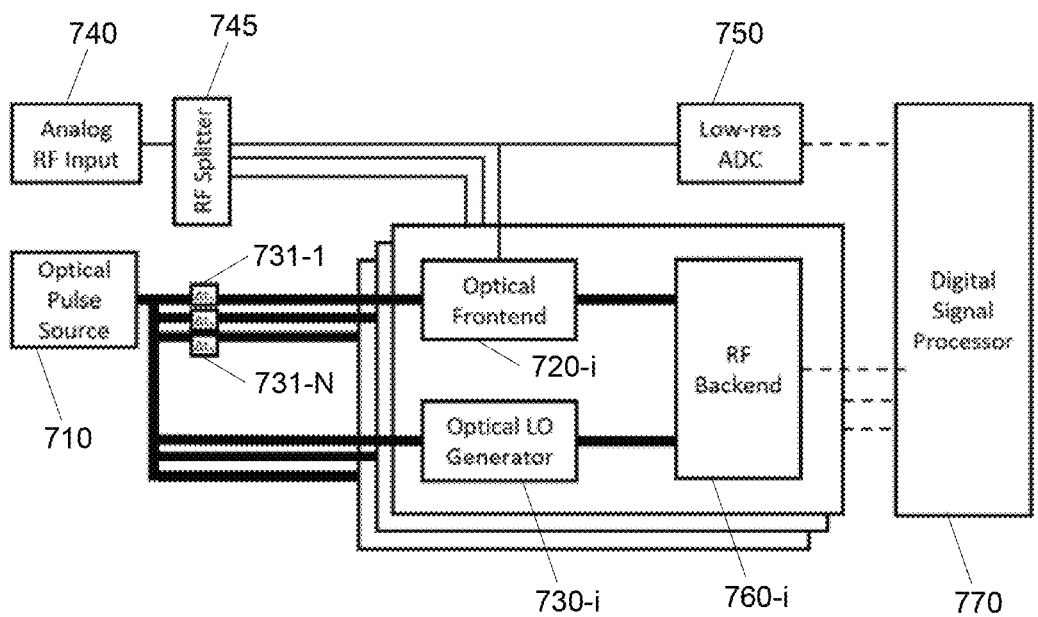
FIG. 7B is a block diagram representation of an RF channelized and time multiplexed receiver for extracting optically phase modulated signals in the electronic domain.
Figure 7C:
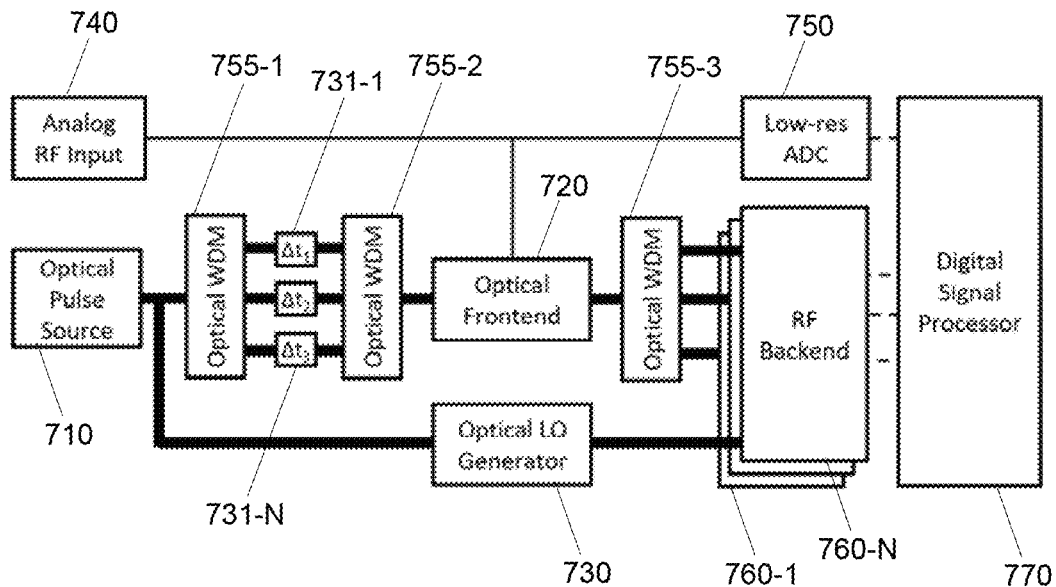
FIG. 7C is a block diagram representation of an optically channelized and frequency multiplexed receiver for extracting optically phase modulated signals in the electronic domain.
Figure 7D:
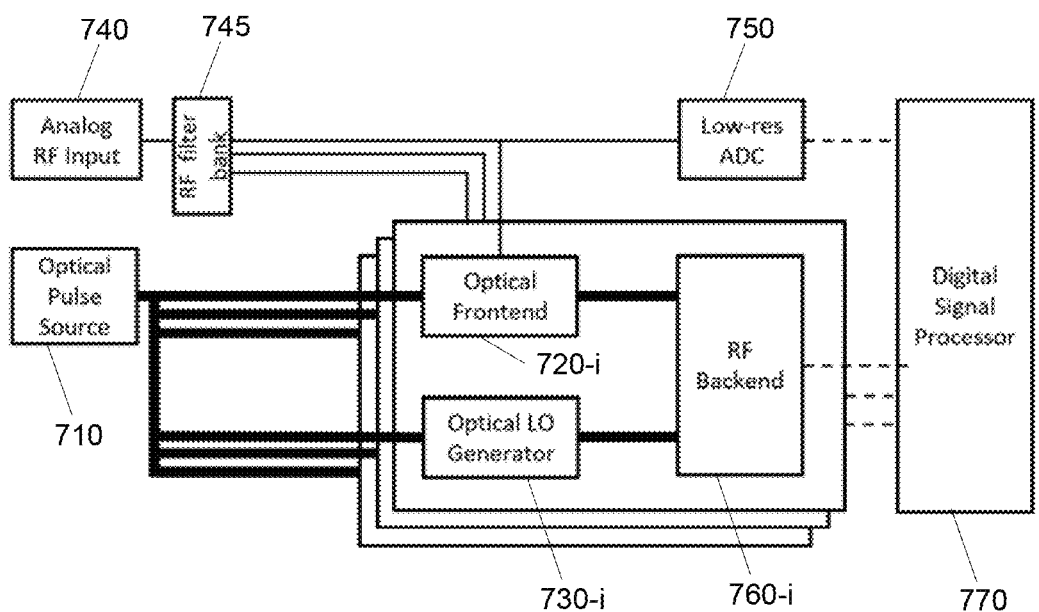
FIG. 7D is a block diagram representation of an RF channelized and frequency multiplexed receiver for extracting optically phase modulated signals in the electronic domain.

FIGS. 7A and 7C show examples of optical multiplexing, wherein channelization increases the rate of optical pulses entering into the VTOF.

In some embodiments, channelization can be performed using time domain multiplexing (TDM) or wavelength division multiplexing (WDM), as illustrated in FIGS. 7A-7B and FIGS. 7C-7D, respectively. In the former, a higher laser repetition rate is chosen to enter the system, but the optical pulse train is split into M channels after the optical frontend 720 with an actively clocked optical switch bank 755. Each channel operates at 1/M the original repetition rate of the laser (1/T), and is recorded by a bank of M ADCs (within the RF backends 760-1 through 760-N). In the latter, a laser with lower pulse repetition rate but higher bandwidth is required. Then, the pulse bandwidth may be separated into M wavelength channels, delayed, and recombined to form a train of pulses with a higher repetition rate of M/T. The advantage of the latter is that a passive wavelength splitter element can be used after the amplitude tunable filter (ATF) to channelize.

The RF multiplexing embodiments (illustrated in the examples in FIGS. 7B and 7D), work similarly. In the time multiplexed realization, the analog RF input is split into M identical channels, each of which modulates a separate optical pulse train, which have been delayed by multiples of T/M. In the frequency multiplexing realization, an RF filter bank splits the input signal into independent frequency bands, each of which modulates a separate optical sampling system (each of which includes, for example, an optical frontend 720-i, an optical LO generator 730-i, and an RF backend 760-i). The advantage of the latter is that each subsystem is exposed to only a fraction of the original signal bandwidth, but it does require more complex signal reconstruction.

As described above, the channelization embodiments illustrated in FIGS. 7A-7D increase the overall resolution, sample rate, and time aperture of the embodiment to satisfy a wide range of design requirements.

Figure 8:
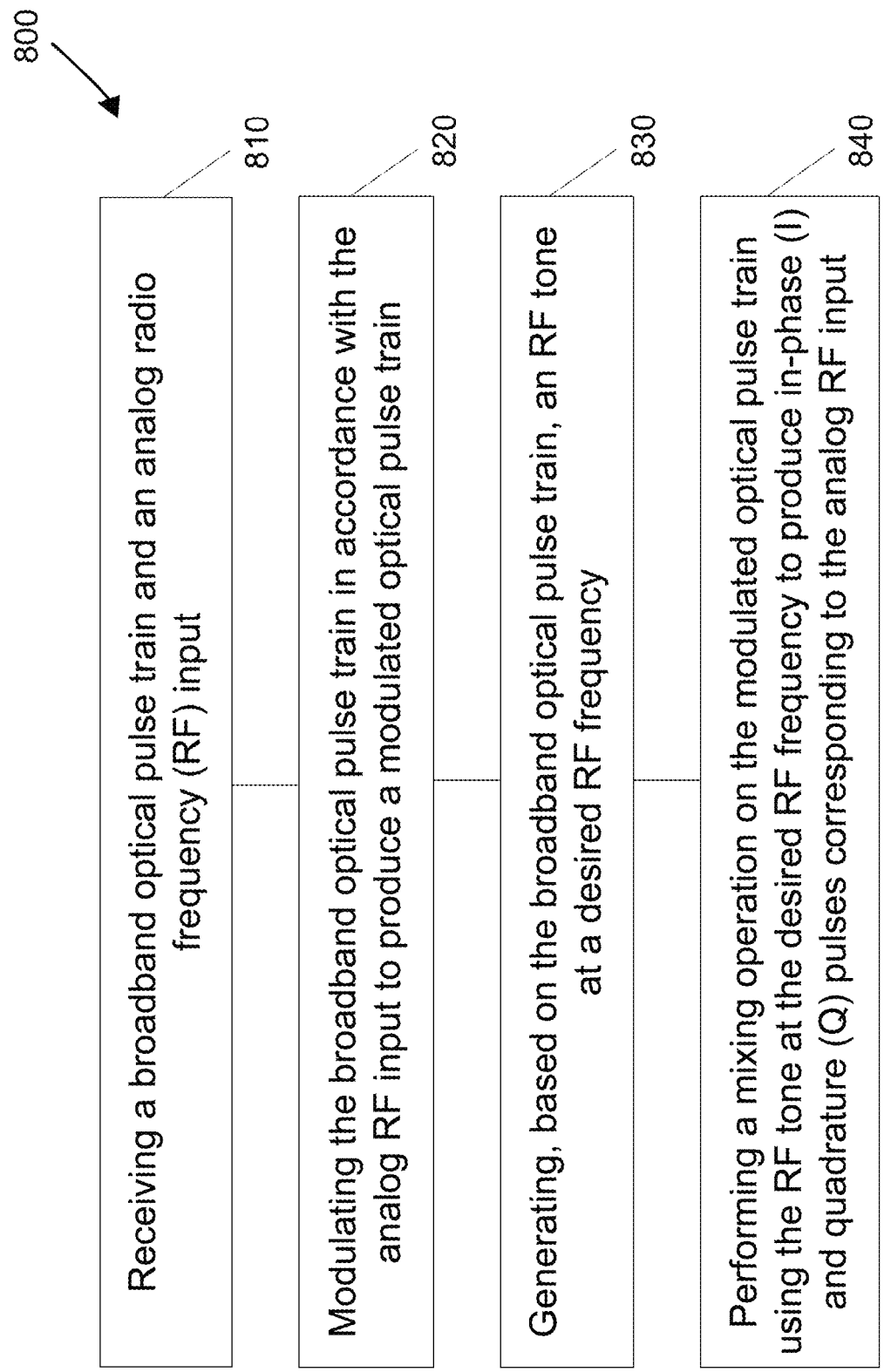
FIG. 8 illustrates a flowchart of an example method for extracting optically phase modulated signals in the electronic domain.

FIG. 8 illustrates a flowchart of an example method 800 for extracting optically phase modulated signals in the electronic domain. The method 800 includes, at operation 810, receiving a broadband optical pulse train and an analog radio frequency (RF) input.

The method 800 includes, at operation 820, modulating the broadband optical pulse train in accordance with the analog RF input to produce a modulated optical pulse train.

The method 800 includes, at operation 830, generating, based on the broadband optical pulse train, an RF tone at a desired RF frequency.

The method 800 includes, at operation 840, performing a mixing operation on the modulated optical pulse train using the RF tone at the desired RF frequency to produce in-phase (I) and quadrature (Q) pulses corresponding to the analog RF input.

In some embodiments, the method 800 further includes the operations of processing the broadband optical pulse train to produce an output optical pulse train with a fixed spectral ripple, the fixed spectral ripple based on the desired RF frequency; mapping the output optical pulse train to a time-domain modulated optical pulse train, wherein a peak of a pulse of the time-domain modulated optical pulse train is aligned with the desired RF frequency; converting the time-domain modulated optical pulse train to an analog electrical signal; and filtering the analog electrical signal to generate the RF tone at the desired RF frequency.

Embodiments of the disclosed technology include an optical local oscillator (LO) generator configured to generate a radio frequency (RF) tone at a desired RF frequency, comprising: a first input configured to receive a broadband optical pulse train; a second input coupled to a delay line interferometer to receive a first control voltage for controlling a delay value of the interferometer and to produce an output optical pulse train; a dispersive element, coupled to the delay line interferometer, to map the output optical pulse train to a time-domain modulated optical pulse train, wherein a peak of a pulse of the time-domain modulated optical pulse train is aligned with the desired RF frequency; an optical-to-electrical converter, coupled to the dispersive element, to convert the time-domain modulated optical pulse train to an analog electrical signal; and an RF filter, coupled to the optical-to-electrical converter, to filter the analog electrical signal to generate the RF tone at the desired RF frequency.

In some embodiments, the optical LO generator further comprises a third input coupled to the dispersive element and configured to receive a second control voltage, wherein a power of the RF tone at the desired RF frequency is based on the third input.

In some embodiments, the electrooptic modulator, the optical delay component and the combiner/splitter are components of a delay line interferometer.

Embodiments of the disclosed technology include an apparatus for extracting optically phase modulated signals in the electronic domain, comprising: a first input configured to receive an analog radio frequency (RF) input; a second input configured to receive a broadband optical pulse train; an optical frontend coupled to the first input and the second input to receive the analog RF input and the broadband optical pulse train, and to modulate the broadband optical pulse train in accordance with the analog RF signal, the optical frontend configured to output a modulated optical pulse train; an optical local oscillator (LO) generator coupled to the second input to receive the broadband optical pulse train, and to produce an RF tone at a desired RF frequency; and an RF backend coupled to the optical frontend and to the optical LO generator to receive the modulated optical pulse train and the RF tone at the desired RF frequency, and to mix the modulated optical pulse train using the RF tone at the desired RF frequency to produce in-phase (I) and quadrature (Q) pulses corresponding to the analog RF input.

In some embodiments, the optical LO generator comprises an optical-to-electrical converter coupled to the second input to receive the broadband optical pulse train, and to convert the broadband optical pulse train to an analog electrical signal; and an RF filter, coupled to the optical-to-electrical converter, to filter the analog electrical signal to generate the RF tone at the desired RF frequency.

In some embodiments, the apparatus further comprises a first analog-to-digital converter (ADC) coupled to the RF backend to receive the I and Q pulses and produce a first digital signal corresponding to the analog RF input.

In some embodiments, the apparatus further comprises a second ADC to receive the analog RF input and produce a second digital signal comprising a coarse phase estimate of the analog RF input; and a digital signal processor, coupled to the first ADC and to the second ADC, to receive the first digital signal and the second digital signal, and to produce an output digital signal corresponding to the analog RF input, wherein the digital signal processor is configured to perform a phase unwrapping operation based an absence of phase ambiguity in the second digital signal.

In some embodiments, the apparatus further comprises an optical filter, comprising an optical modulator and a static optical spectral shaping filter, configured to performing a filtering operation on the broadband optical pulse train, wherein the filtering operation compensates for inter-symbol interference due at least one component of the RF backend and/or the high-sensitivity ADC, and wherein the static optical spectral shaping filter is based on one or more transfer functions of the at least one component of the RF backend and/or the high-sensitivity ADC.

In some embodiments, the optical frontend comprises an optical-to-electrical converter, and wherein an output of the optical filter is positioned prior to an input of the optical-to-electrical converter.

In some embodiments, the optical-to-electrical converter comprises a balanced photodetector.

In some embodiments, the delay line interferometer includes an electrooptic modulator coupled to the first input to receive the broadband optical pulse train and to produce two complementary optical outputs that form two arms of an interferometer; an optical delay component coupled to the electrooptic modulator and to the second input to impart an optical path difference, based on the first control voltage, into one of the two complementary optical outputs of the electrooptic modulator; and a combiner/splitter to receive the two complementary optical outputs of the electrooptic modulator after impartation of the optical path difference and to produce the output optical pulse train.

Embodiments of the disclosed technology include an apparatus for extracting optically phase modulated signals, comprising: a first input configured to receive an analog radio frequency (RF) input; a second input configured to receive a broadband optical pulse train at a repetition rate of 1/T; an optical frontend coupled to the first input and the second input to receive the analog RF input and the broadband optical pulse train, and to modulate the broadband optical pulse train in accordance with the analog RF signal, the optical frontend configured to output a modulated optical pulse train; an optical switch coupled to the optical frontend to receive and replicate the modulated optical pulse train, and output a plurality of modulated optical pulse trains; an optical local oscillator (LO) generator coupled to the second input to receive the broadband optical pulse train, and to produce an RF tone at a desired RF frequency; and a plurality of RF backends, each of the plurality of RF backends coupled to the optical switch and to the optical LO generator to receive a corresponding one of the plurality of modulated optical pulse trains and the RF tone, and to produce in-phase (I) and quadrature (Q) pulses corresponding to the analog RF input, wherein the plurality of RF backends comprises M RF backends, wherein M is a positive integer, and wherein mixing to produce the I and Q pulses is performed at a rate of 1/(MT).

In some embodiments, the operations associated with the RF backend is divided amongst a plurality of RF backend subsystems that each operate at a lower rate than the RF backend, and further including an optical switch coupled between the frontend and the plurality of RF backend subsystems to provide a plurality of inputs to the plurality of RF backend subsystems.

Embodiments of the disclosed technology include an apparatus for extracting optically phase modulated signals, comprising: a plurality of first inputs, each of the plurality of first inputs configured to receive an analog radio frequency (RF) inputs; a plurality of second inputs, each of the plurality of second inputs configured to receive a broadband optical pulse train with a distinct time delay, the broadband optical pulse having a repetition rate of 1/T, the plurality of second inputs comprising M inputs, wherein M is a positive integer, and wherein the distinct time delay is a distinct multiple of T/M; and a plurality of optical pulse train processors, each optical pulse train processor comprising: an optical frontend coupled to a corresponding one of the plurality of first inputs and a corresponding one of the plurality of second inputs to receive the corresponding analog RF input and the corresponding broadband optical pulse train with the distinct time delay, and to modulate the corresponding broadband optical pulse train with the distinct time delay in accordance with the corresponding analog RF signal, the optical frontend configured to output a modulated optical pulse train; an optical local oscillator (LO) generator coupled to the corresponding one of the plurality of second inputs to receive the corresponding broadband optical pulse train with the distinct time delay, and to produce an RF tone at a desired RF frequency; and an RF backend coupled to the optical frontend and to the optical LO generator to receive the modulated optical pulse train and the RF tone at the desired RF frequency, and to mix the modulated optical pulse train using the RF tone at the desired RF frequency to produce a corresponding in-phase (I) and quadrature (Q) pulses corresponding to the analog RF input.

Embodiments of the disclosed technology include an apparatus for extracting optically phase modulated signals, comprising: a first input configured to receive an analog radio frequency (RF) input; a second input configured to receive a broadband optical pulse train at a repetition rate of 1/T; an optical wavelength division multiplexing (WDM) module to receive and separate the broadband optical pulse train into a plurality of wavelength channels, impart each of a plurality of optical path differences into each of the plurality of wavelength channels, and recombine the plurality of wavelength channels after impartation of the plurality of optical path differences to generate a recombined optical pulse train, wherein the plurality of optical path differences comprises M distinct optical path differences, wherein M is a positive integer, and wherein a repetition rate of the recombined optical pulse train is M/T; an optical frontend coupled to the first input and the optical WDM module to receive the analog RF input and the recombined optical pulse train, and to modulate the recombined optical pulse train in accordance with the analog RF signal, the optical frontend configured to output a modulated optical pulse train; an optical wavelength division multiplexer (WDM) coupled to the optical frontend to receive and separate the modulated optical pulse train, and output a plurality of modulated wavelength channels; an optical local oscillator (LO) generator coupled to the second input to receive the broadband optical pulse train, and to produce an RF tone at a desired RF frequency; and a plurality of RF backends, each of the plurality of RF backends coupled to the optical WDM and to the optical LO generator to receive a corresponding one of the plurality of modulated wavelength channels and the RF tone at the desired RF frequency, and to mix the corresponding one of the plurality of modulated wavelength channels using the RF tone at the desired RF frequency to produce corresponding in-phase (I) and quadrature (Q) pulses corresponding to the analog RF input.

Embodiments of the disclosed technology include an apparatus for extracting optically phase modulated signals, comprising: a plurality of first inputs, each of the plurality of first inputs configured to receive an analog radio frequency (RF) input in a distinct frequency band; a plurality of second inputs, each of the plurality of second inputs configured to receive a broadband optical pulse train; and a plurality of optical pulse train processors, each optical pulse train processor comprising: an optical frontend coupled to a corresponding one of the plurality of first inputs and a corresponding one of the plurality of second inputs to receive the corresponding analog RF input in the distinct frequency band and the corresponding broadband optical pulse train, and to modulate the corresponding broadband optical pulse train in accordance with the corresponding analog RF signal in the distinct frequency band, the optical frontend configured to output a modulated optical pulse train; an optical local oscillator (LO) generator coupled to the corresponding one of the plurality of second inputs to receive the corresponding broadband optical pulse train, and to produce an RF tone at a desired RF frequency; and an RF backend coupled to the optical frontend and to the optical LO generator to receive the modulated optical pulse train and the RF tone at the desired RF frequency, and to mix the modulated optical pulse train using the RF tone at the desired RF frequency to produce a corresponding in-phase (I) and quadrature (Q) pulses corresponding to the analog RF input.

At least parts of the disclosed embodiments (e.g., the digital processor) can be implemented in digital electronic circuitry, or in computer software, firmware, or hardware. For example, electronic circuits can be used to control the operation of the detector arrays and/or to process electronic signals that are produced by the detectors. At least some of those embodiments or operations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical local oscillator (LO) generator configured to generate a radio frequency (RF) tone at a desired RF frequency, comprising:
    a first input configured to receive a broadband optical pulse train;
    a second input coupled to a delay line interferometer to receive a first control voltage for controlling a delay value of the interferometer and to produce an output optical pulse train;
    a dispersive element, coupled to the delay line interferometer, to map the output optical pulse train to a time-domain modulated optical pulse train, wherein a spectral peak of the time-domain modulated optical pulse train is aligned with the desired RF frequency;
    an optical-to-electrical converter, coupled to the dispersive element, to convert the time-domain modulated optical pulse train to an analog electrical signal; and
    an RF filter, coupled to the optical-to-electrical converter, to filter the analog electrical signal to generate the RF tone at the desired RF frequency.

2. The optical LO generator of claim 1, further comprising:
    a third input coupled to the dispersive element and configured to receive a second control voltage, wherein a power of the RF tone at the desired RF frequency is based on the third input.

3. The optical LO generator of claim 1, wherein the delay line interferometer includes an optical delay component and a combiner/splitter.

4. An apparatus for extracting optically phase modulated signals in the electronic domain, comprising:
    a first input configured to receive an analog radio frequency (RF) input;
    a second input configured to receive a broadband optical pulse train;
    an optical frontend coupled to the first input and the second input to receive the analog RF input and the broadband optical pulse train, and to modulate the broadband optical pulse train in accordance with the analog RF signal, the optical frontend configured to output a modulated optical pulse train;
    an optical local oscillator (LO) generator coupled to the second input to receive the broadband optical pulse train, and to produce an RF tone at a desired RF frequency; and
    an RF backend coupled to the optical frontend and to the optical LO generator to receive the modulated optical pulse train and the RF tone at the desired RF frequency, and to mix the modulated optical pulse train using the RF tone at the desired RF frequency to produce in-phase (I) and quadrature (Q) pulses corresponding to the analog RF input.

5. The apparatus of claim 4, wherein the optical LO generator comprises:
a delay line interferometer to receive broadband optical pulse train;
a dispersive element, coupled to the delay line interferometer, to map the output optical pulse train to a time-domain modulated optical pulse train; and
an optical-to-electrical converter, coupled to the dispersive element, to convert the time-domain modulated optical pulse train to an analog electrical signal.

6. The apparatus of claim 4, wherein the optical LO generator comprises:
an optical-to-electrical converter coupled to the second input to receive the broadband optical pulse train, and to convert the broadband optical pulse train to an analog electrical signal; and
an RF filter, coupled to the optical-to-electrical converter, to filter the analog electrical signal to generate the RF tone at the desired RF frequency.

7. The apparatus of claim 6, wherein the optical-to-electrical converter comprises a balanced photodetector which accepts as input two optical pulse trains from the optical frontends.

8. The apparatus of claim 4, further comprising:
at least a first analog-to-digital converter (ADC) coupled to the RF backend to receive the I and Q pulses and produce a first digital signal corresponding to the analog RF input.

9. The apparatus of claim 8, further comprising:
a second ADC to receive the analog RF input and produce a second digital signal comprising a coarse phase estimate of the analog RF input; and
a digital signal processor, coupled to the first ADC and to the second ADC, to receive the first digital signal and the second digital signal, and to produce an output digital signal corresponding to the analog RF input,
wherein the digital signal processor is configured to perform a phase unwrapping operation based on an absence of phase ambiguity in the second digital signal.

10. The apparatus of claim 8, further comprising:
an optical filter, comprising an optical modulator and a static optical spectral shaping filter, configured to perform a filtering operation on the broadband optical pulse train,
wherein the filtering operation compensates for inter-symbol interference due to at least one component of the RF backend or the at least first ADC, and
wherein the static optical spectral shaping filter is based on one or more transfer functions of the at least one component of the RF backend or the at least first ADC.

11. The apparatus of claim 10, wherein the optical filter is positioned between the second input and the optical front end.

12. The apparatus of claim 4, wherein the RF backend comprises:
a first filter configured to receive an electrical signal corresponding to the modulated optical pulse train from the optical frontend,
a second filter configured to receive an electrical signal corresponding to the RF tone from the optical LO generator; and
an RF demodulator configured to receive an output of the first filter and an output of the second filter.

13. The apparatus of claim 4, wherein the RF backend comprises a plurality of RF backend subsystems, wherein operations associated with the RF backend is divided amongst the plurality of RF backend subsystems that each operate at a lower rate than the RF backend, and the apparatus further includes an optical switch coupled between the frontend and the plurality of RF backend subsystems to provide a plurality of inputs to the plurality of RF backend subsystems.

14. The apparatus of claim 13, wherein the broadband optical pulse train has a repetition rate of $1/T$, and the RF backend comprises M RF backends subsystems, wherein M is a positive integer, and wherein mixing to produce the I and Q pulses is performed at a rate of $1/(MT)$.

15. The apparatus of claim 4, comprising a plurality of optical pulse train processors, a plurality of time delay components and an RF splitter, wherein operations associated with the optical front end, the optical LO generator and the RF backend is divided amongst the plurality optical pulse train processors,
wherein each optical pulse train processor includes a subsystem optical front end, a subsystem optical LO generator and a subsystem RF backend that operate at a lower rate than the optical front end, the optical LO generator and the RF backend,
wherein each time delay component is coupled to a corresponding optical pulse train processor and is configured to impart a distinct time delay to the broadband optical pulse train, and
wherein the RF splitter is configured to receive the analog RF input and to provide a version of thereof to each of the optical pulse train processors.

16. The apparatus of claim 15, comprising M optical pulse train processors, wherein M is a positive integer, wherein the broadband optical pulse train has a repetition rate of $1/T$ and the distinct time delay is a distinct multiple of $T/M$.

17. The apparatus of claim 4, comprising:
an optical wavelength division multiplexing (WDM) module to receive and separate the broadband optical pulse train into a plurality of wavelength channels, impart a plurality of optical path differences into each of the plurality of wavelength channels, and recombine the plurality of wavelength channels after impartation of the plurality of optical path differences to generate a recombined optical pulse train,
wherein the optical frontend is coupled to the optical WDM module to receive the recombined optical pulse train, and to modulate the recombined optical pulse train in accordance with the analog RF input, the optical frontend configured to output a modulated optical pulse train,
wherein the apparatus further includes an optical wavelength division multiplexer (WDM) coupled to the optical frontend to receive and separate the modulated optical pulse train, and output a plurality of modulated wavelength channels, and
wherein the RF backend comprises a plurality of RF backend subsystems, each RF backend subsystem configured coupled to the optical WDM and to the optical LO generator to receive a corresponding one of the plurality of modulated wavelength channels and the RF tone at the desired RF frequency, and to mix the corresponding one of the plurality of modulated wavelength channels using the RF tone at the desired RF frequency.

18. The apparatus of claim 17, wherein the broadband optical pulse train has a repetition rate of $1/T$, the plurality of optical path differences comprises M distinct optical path differences, and a repetition rate of the recombined optical pulse train is M/T, wherein M is a positive integer.

19. The apparatus of claim 4, comprising a plurality of optical pulse train processors and an RF splitter, wherein operations associated with the optical front end, the optical LO generator and the RF backend is divided amongst the plurality optical pulse train processors,
  wherein each optical pulse train processor includes a subsystem optical front end, a subsystem optical LO generator and a subsystem RF backend, and
  wherein the RF splitter is configured to receive the analog RF input and to split the analog RF input into distinct frequency bands, wherein each analog RF input with a distinct frequency band is provided to a corresponding optical pulse train processor.

20. A method for generating a radio frequency (RF) tone at a desired RF frequency using an optical local oscillator (LO) generator, the method comprising:
  receiving a broadband optical pulse train at a first input of the optical LO generator;
  receiving a first control voltage at a second input of the optical LO generator that is coupled to a delay line interferometer to control a delay value of the interferometer and to produce an output optical pulse train;
  mapping the output optical pulse train to a time-domain modulated optical pulse train using a dispersive element, wherein a spectral peak of the time-domain modulated optical pulse train is aligned with the desired RF frequency;
  converting the time-domain modulated optical pulse train to an analog electrical signal; and
  filtering the analog electrical signal to generate the RF tone at the desired RF frequency.

21. A method for extracting optically phase modulated signals in the electronic domain, comprising:
  receiving a broadband optical pulse train and an analog radio frequency (RF) input;
  modulating the broadband optical pulse train in accordance with the analog RF input to produce a modulated optical pulse train;
  generating, based on the broadband optical pulse train, an RF tone at a desired RF frequency; and
  performing a mixing operation on the modulated optical pulse train using the RF tone at the desired RF frequency to produce in-phase (I) and quadrature (Q) pulses corresponding to the analog RF input.

22. The method of claim 21, wherein generating the RF tone comprises:
  processing the broadband optical pulse train to produce an output optical pulse train with a fixed spectral ripple, the fixed spectral ripple being based on the desired RF frequency;
  mapping the output optical pulse train to a time-domain modulated optical pulse train, wherein a peak of a pulse of the time-domain modulated optical pulse train is aligned with the desired RF frequency;
  converting the time-domain modulated optical pulse train to an analog electrical signal; and
  filtering the analog electrical signal to generate the RF tone at the desired RF frequency.

* * * * *

UNITED STATES PATENT AND TRADEMARK OFFICE
CERTIFICATE OF CORRECTION

PATENT NO. : 11,032,628 B2  
APPLICATION NO. : 16/869320  
DATED : June 8, 2021  
INVENTOR(S) : Perlmutter et al.

Page 1 of 1

It is certified that error appears in the above-identified patent and that said Letters Patent is hereby corrected as shown below:

On the Title Page

(54) and in the Specification Column 1 Lines 1-3 In the title, delete "ELECTRONIC DEMODULATION OF OPTICALLY PHASE DEMODULATED SIGNALS" and insert -- ELECTRONIC DEMODULATION OF OPTICALLY PHASE MODULATED SIGNALS --, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*